(12) United States Patent
Boenisch et al.

(10) Patent No.: US 10,037,193 B2
(45) Date of Patent: Jul. 31, 2018

(54) EXTRACTING ENTROPY FROM MOBILE DEVICES TO GENERATE RANDOM NUMBERS

(71) Applicant: INTERNATIONAL BUSINESS MACHINES CORPORATION, Armonk, NY (US)

(72) Inventors: Volker M. M. Boenisch, Boeblingen (DE); Reinard T. Buendgen, Tuebingen (DE); Franziska Geisert, Altdorf (DE); Jakob C. Lang, Altdorf (DE); Mareike Lattermann, Stuttgart (DE); Budy D. Notohardjono, Poughkeepsie, NY (US); Angel N. Mencias, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 201 days.

(21) Appl. No.: 14/963,884

(22) Filed: Dec. 9, 2015

(65) Prior Publication Data

US 2017/0168776 A1   Jun. 15, 2017

(51) Int. Cl.
*G06F 7/58* (2006.01)

(52) U.S. Cl.
CPC .......... *G06F 7/588* (2013.01); *G06F 2207/58* (2013.01)

(58) Field of Classification Search
None
See application file for complete search history.

(56) References Cited

U.S. PATENT DOCUMENTS

| | | | |
|---|---|---|---|
| 8,542,827 B2 | 9/2013 | Razzell | |
| 2002/0076015 A1 | 6/2002 | Norwitz et al. | |
| 2014/0136583 A1* | 5/2014 | Hyde | G06F 7/588 708/250 |
| 2014/0372767 A1 | 12/2014 | Green et al. | |
| 2015/0006601 A1 | 1/2015 | Aissi et al. | |
| 2015/0100613 A1 | 4/2015 | Osiecki et al. | |
| 2015/0117637 A1 | 4/2015 | Best et al. | |

OTHER PUBLICATIONS

D. Mahu, et al., "Secure Entropy Gatherer", International Conference on Control Systems and Science, 20th, IEEE, 2015, pp. 1-6.

* cited by examiner

*Primary Examiner* — Michael D. Yaary
(74) *Attorney, Agent, or Firm* — Cantor Colburn LLP

(57) ABSTRACT

Embodiments include method, systems and computer program products for extracting entropy from mobile devices to generate random numbers. In some embodiments, first vibration data may be received from a first device. Second vibration data may be received from a second device. A first piece of entropy data may be generated using the first vibration data and a second piece of entropy data may be generated using the second vibration data. The first piece of entropy data and the second piece of entropy data may be aggregated. The first piece of entropy data and the second piece of entropy data may be stored in an entropy pool.

20 Claims, 5 Drawing Sheets

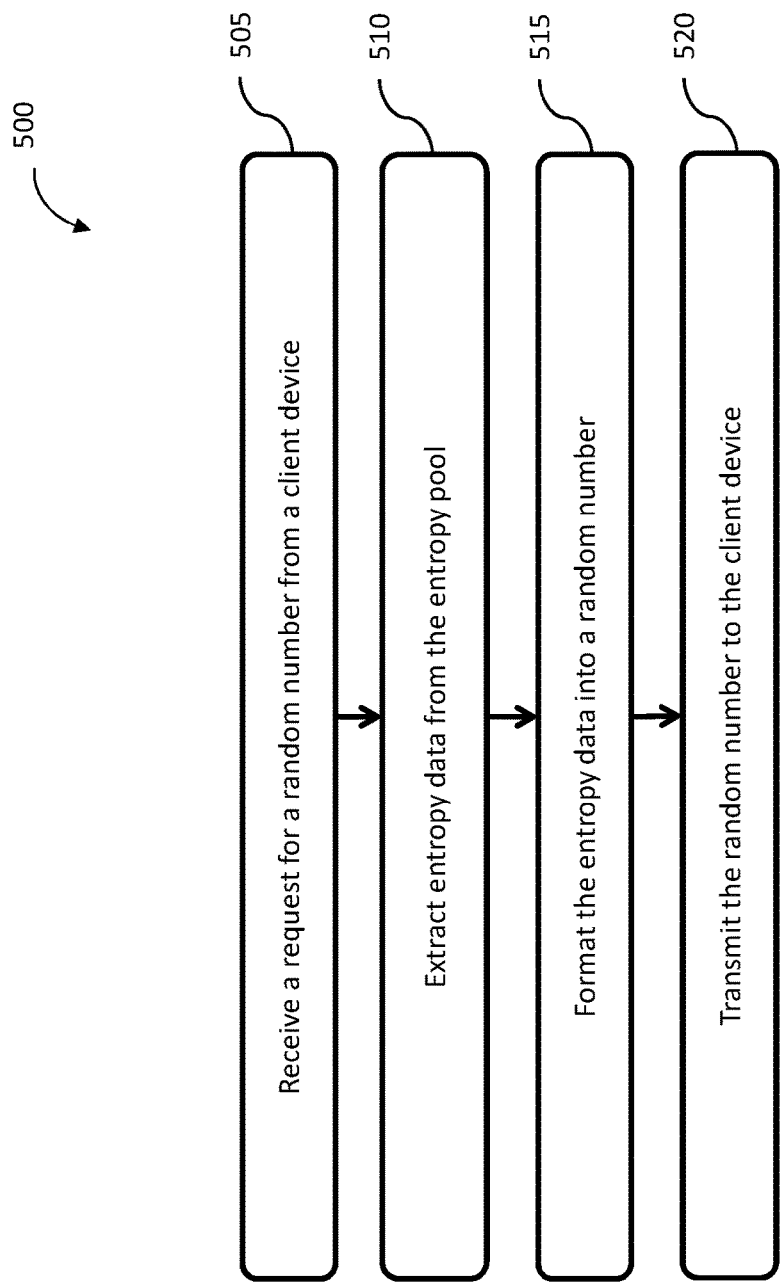

EXTRACTING ENTROPY FROM MOBILE DEVICES TO GENERATE RANDOM NUMBERS

BACKGROUND

The present disclosure relates to methods, systems and computer program products for extracting entropy from devices to generate random numbers.

Cryptography application and other security relevant features (e.g., generating cryptographic keys in SSL protocols, encryption, signatures, etc.) may require a constant flow of new random numbers that cannot be replicated or predicted. Currently there are several methods for generating random number. For example, a pseudo random number generator may generate random numbers, but the numbers generated may be deterministic. Another method for generating random numbers may be to use timings of I/O as random input. However, some computers may not have interactive I/O, and therefore do not have a source for random data.

SUMMARY

In accordance with an embodiment, a computer-implemented method may be provided. First vibration may be received from a first mobile device. Second vibration data may be received from a second mobile device. A first piece of entropy data may be generated using the first vibration data and a second piece of entropy data may be generated using the second vibration data. The first piece of entropy data and the second piece of entropy data may be aggregated. The first piece of entropy data and the second piece of entropy data may be stored in an entropy pool.

In another embodiment, a computer program product comprising a non-transitory storage medium readable by a processing circuit and storing instructions for execution by the processing circuit for performing a method may be provided. The method may include receiving first vibration data from a first mobile device; receiving second vibration data from a second mobile device; generating a first piece of entropy data using the first vibration data and a second piece of entropy data using the second vibration data; aggregating the first piece of entropy data and the second piece of entropy data; and storing the first piece of entropy data and the second piece of entropy data in an entropy pool.

In another embodiment, a system may be provided. The system may comprise a processor in communication with one or more types of memory, the processor configured to receive first vibration data from a first mobile device; receive second vibration data from a second mobile device; generate a first piece of entropy data using the first vibration data and a second piece of entropy data using the second vibration data; aggregate the first piece of entropy data and the second piece of entropy data; and store the first piece of entropy data and the second piece of entropy data in an entropy pool.

BRIEF DESCRIPTION OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

FIG. 5 is a flow diagram of a method for requesting a random number from an entropy server in accordance with an exemplary embodiment.

DETAILED DESCRIPTION

In accordance with exemplary embodiments of the disclosure, methods, systems and computer program products for extracting entropy from devices to generate random numbers. The methods and systems described herein are directed to using machine vibration measurements for random number generation. In some embodiments, the machine may be a mobile device, such as smart phone, tablet, laptop, or the like, that has integrated sensors, such as an accelerometer that may capture analog vibration data. Other examples of devices that may generate vibration data may include cars, washing machines, or the like. The vibrations may be generated by moving components internal to the machine frame such as cooling fans or come from an external source such as external vibration or the movement of mobile devices. The analog data generated or captured by the accelerometer may be converted into a digital form. The digital data may be transmitted to a remote server for processing. The server may aggregate the entropy data generated from data captured from different devices and may store the entropy data in a memory unit to form an entropy pool. Entropy data may be extracted from the entropy pool and formatted into random numbers.

Figure 1:
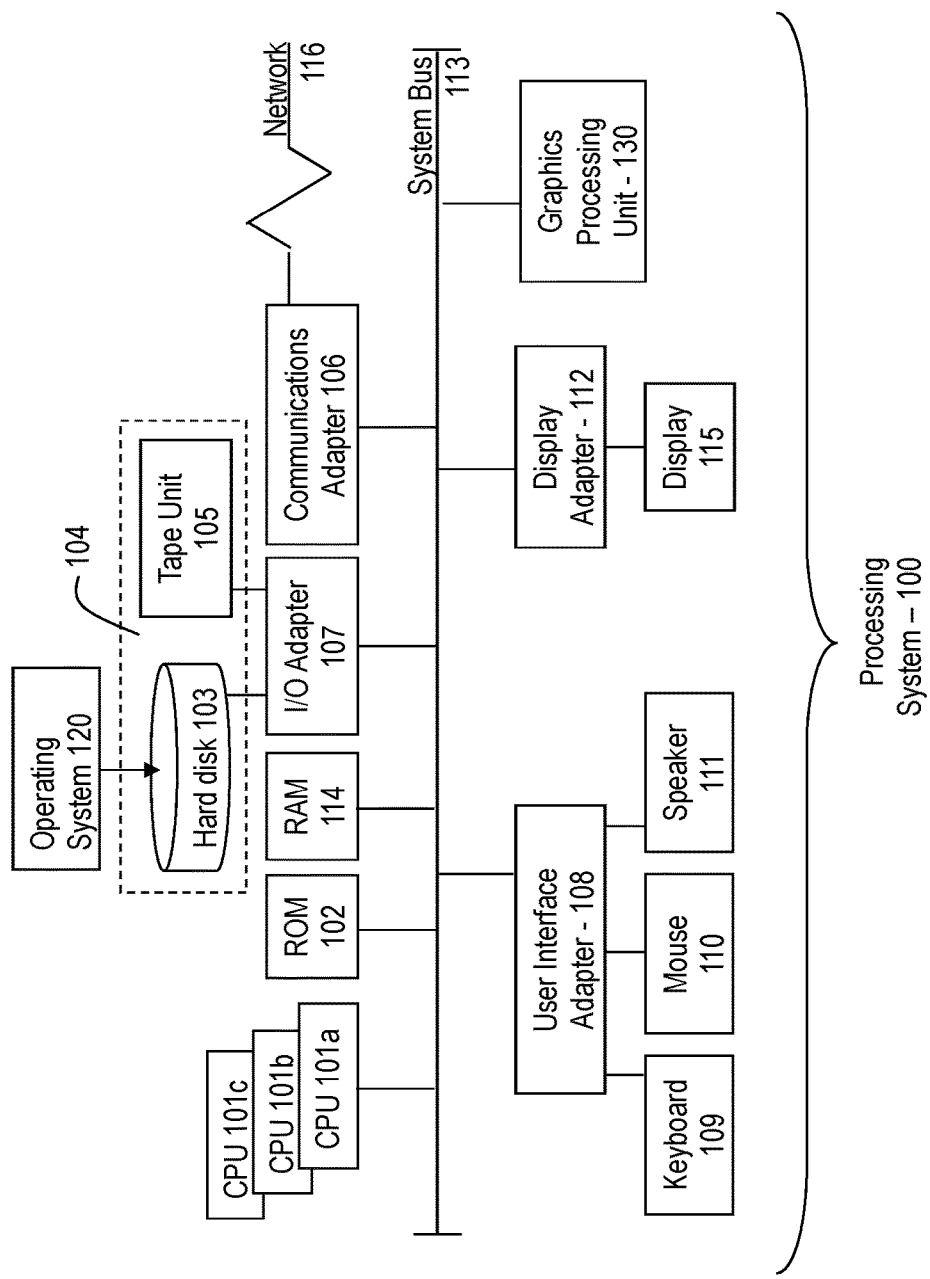
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
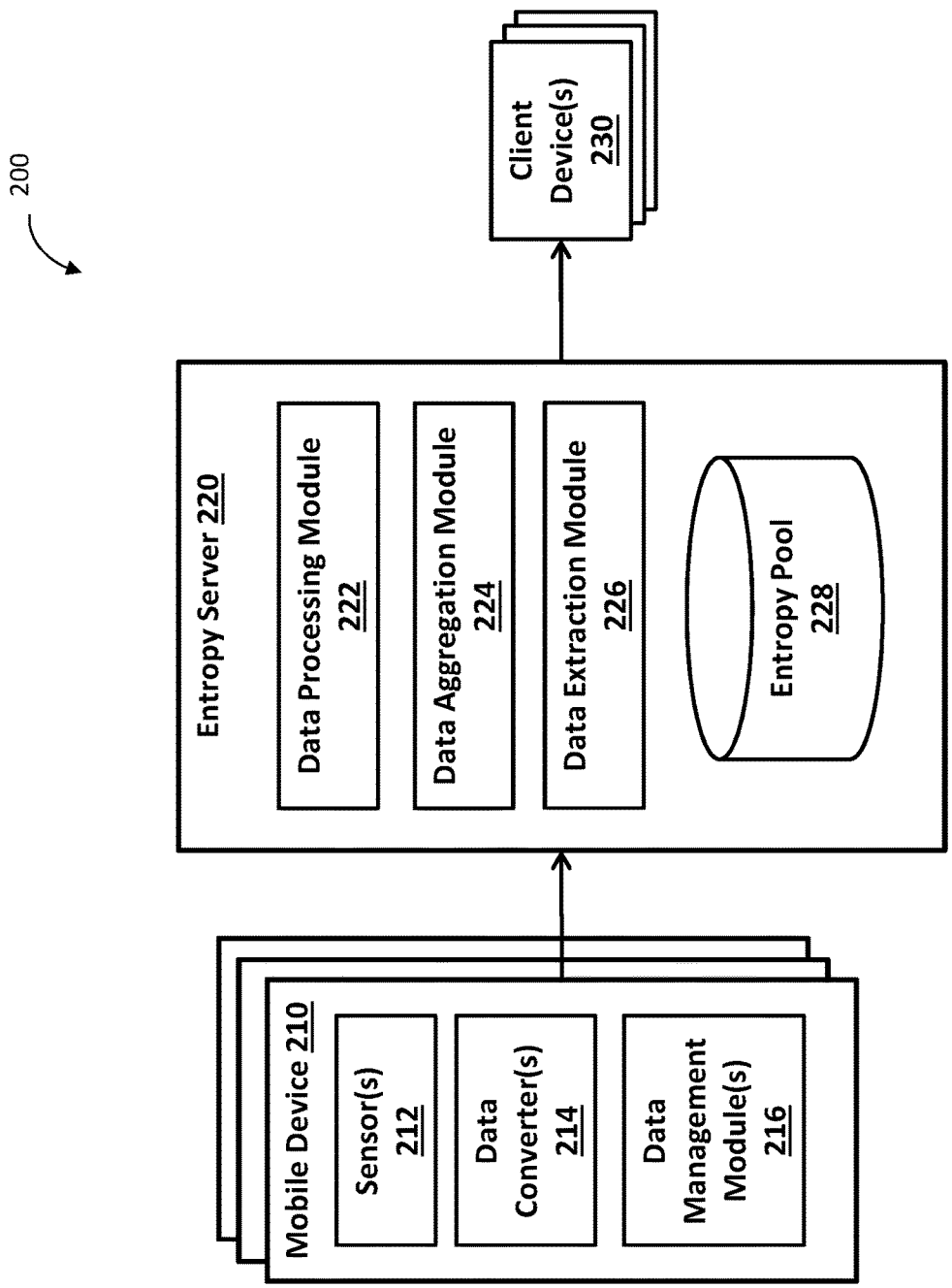
FIG. 2 is a block diagram illustrating a computing system in accordance with an exemplary embodiment.

Referring now to FIG. 2, a computing system 200 in accordance with an embodiment is illustrated. As illustrated, the computing system 200 may include, but is not limited to, one or more mobile devices 210, an entropy server 220, and one or more client devices 230. In some embodiments, a mobile device 210 may include two or more sensors 212, a data converter 214, and a data management module 216.

The data converter 214 may include computer-readable instructions that in response to execution by the processor(s) 101 cause operations to be performed including receiving data from two or more sensors 212 of a mobile device 210. Examples of sensors may include but are not limited to a gyroscope, accelerometer, or the like. The data converter 214 may receive the raw data from the two or more sensors 212 and may convert the data to digital data. Upon conversion of the data to digital data, the data converter 214 may transmit the digital data to a data management module 216.

The data management module 216 may include computer-readable instructions that in response to execution by the processor(s) 101 cause operations to be performed including receiving vibration data from the data converter 214. In some embodiments, the data management module 216 may process the digitized data to generate entropy data. In some embodiments, the digitized data may be processed by the entropy server 220 to generate entropy data. In some embodiments, the data management module 216 may generate a signature to associate with the digitized data using a private key. The data management module 216 may establish a secure connection with the entropy server 220 and may transmit the digitized data (and signature) to the entropy server 220.

In some embodiments, the entropy server 220 may include a data processing module 222, a data aggregation module 224, a data extraction module 226, and/or an entropy pool 228.

The data processing module 222 may include computer-readable instructions that in response to execution by the processor(s) 101 cause operations to be performed including receiving vibration data from the different devices 210 and filtering and formatting the digitized data to generate entropy data. In some embodiments, the data processing module 222 may apply a secure hash to the filtered and formatted data to generate pieces of entropy data.

The data aggregation module 224 may include computer-readable instructions that, in response to execution by the processor(s) 101, cause operations to be performed including receiving pieces of entropy data generated from data from different devices 210 and aggregating them. In some embodiments, the pieces of entropy data may be aggregated using an exclusive or operation on the numbers. The data aggregation module 224 may store the aggregated entropy data in the entropy pool 228.

The data extraction module 226 may include computer-readable instructions that in response to execution by the processor(s) 101 cause operations to be performed including receiving a request from one or more client devices 230. Client devices 230 may request random numbers from the entropy server 220. The data extraction module 226 may process the request, obtain entropy data from the entropy pool 228, and format the entropy data into a random number for transmission. In some embodiments, the data extraction module 226 may encrypt or otherwise secure the random number and may transmit the requested information over a secure network connection to the requesting client device 230.

The client devices 230 may be any type of device that is capable of establishing a network connection and requesting a random number. In some embodiments, devices 210 may also be client devices 230. In some embodiments, the client devices 230 may request data from the data extraction module 226. The client devices 230 may obtain a random number from the entropy server 220 and may use the random number for different purposes, such as different cryptographic mechanisms.

Figure 3:
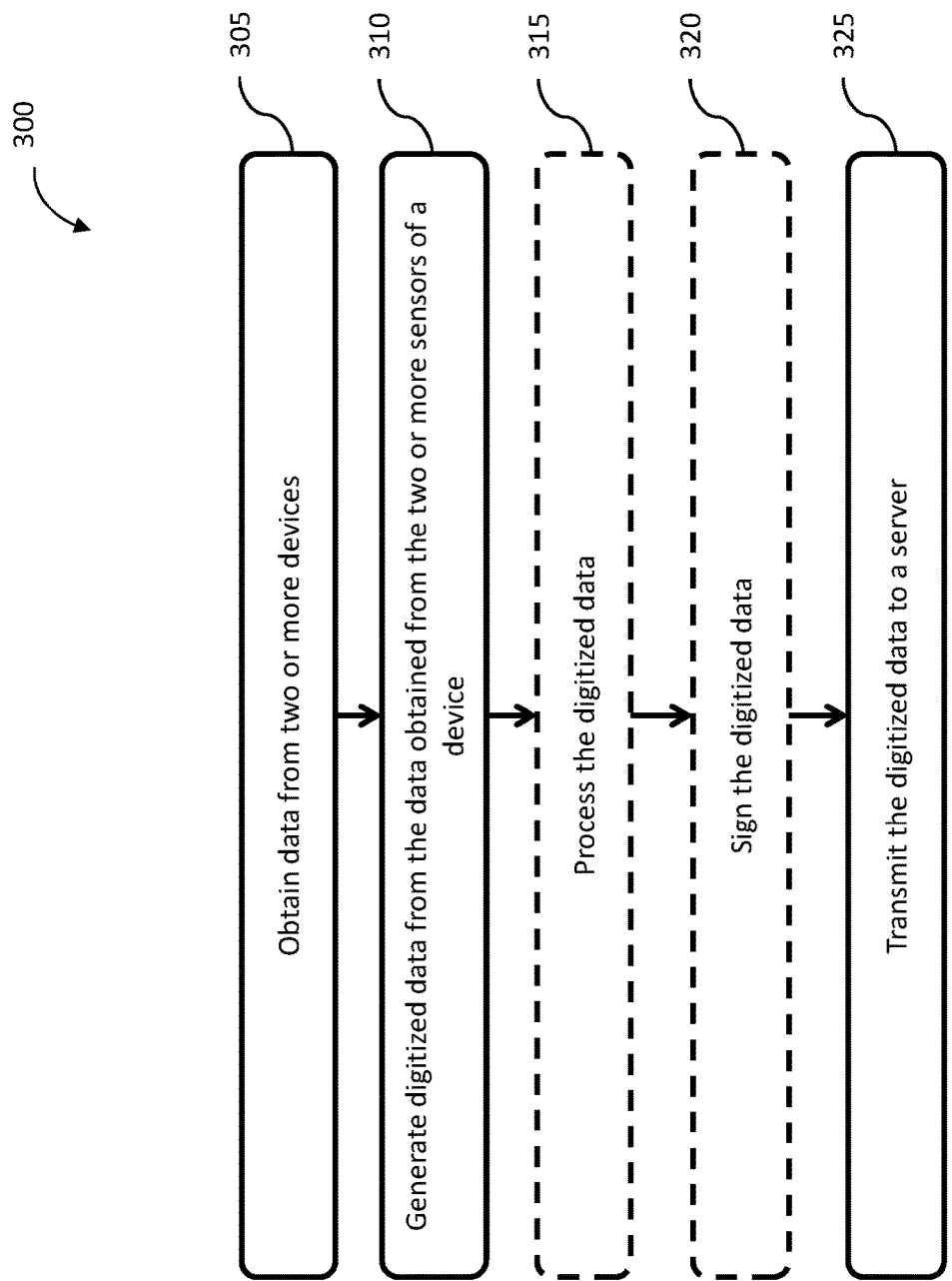
FIG. 3 is a flow diagram of a method for collecting entropy on a mobile device in accordance with an exemplary embodiment.

Now referring to FIG. 3, a flow diagram of a method 300 for collecting entropy on a device, in accordance with an exemplary embodiment, is depicted. At block 305, data may be obtained from two or more devices 210. In some embodiments, the data collected may be vibration data. Vibration data may be collected from a device 210 from two or more sensors 212. Examples of sensors may include accelerometers, gyroscopes, and the like. In some embodiments, the sensors 212 may be internally integrated in the device 210. In some embodiments, the sensors 212 may be external to the device 210 and associated with the device 210. For example, a device 210 may be associated with a mechanism to capture the vibrations, convert the vibrations to a digital signal, and then transmit the data to a server. An example of a device associated with such a mechanism may be a washing machine that is associated with a tool that has two or more sensors 212 to capture vibration data from the washing machine, process the data, and transmit the data to an entropy server 220.

At block 310, one or more data converter(s) 214 may generate digitized vibration data from the data obtained from the two or more sensors of a device 210. For example, the data converter 214 may take the analog data collected by the sensors 212 and may convert the analog data to digitized data.

At optional block 315, the digitized data may be processed. In some embodiments, the digitized data may be processed on the device 210 to increase the efficiency and bandwidth of the entropy server 220. The digitized data may be processed by the data management module 216. In some embodiments, the digitized data may be processed using mechanisms as described in relation to FIG. 4 to generate entropy data or pieces of entropy data.

At optional block 320, a signature may be generated for the digitized data. In some embodiments, the data management module 216 may generate a digital signature using the vibration data and a private key. In some embodiments, the signature may be a digital fingerprint of the digitized data (or random number generated at optional block 315).

At block 325, the data management module 216 may transmit the digitized data to a server. In some embodiments, the data management module 216 may establish a secure connection with an entropy server 220. The data management module 216 may transmit the vibration data and/or entropy data generated from the vibration data to the entropy server 220 over the secure connection.

Figure 4:
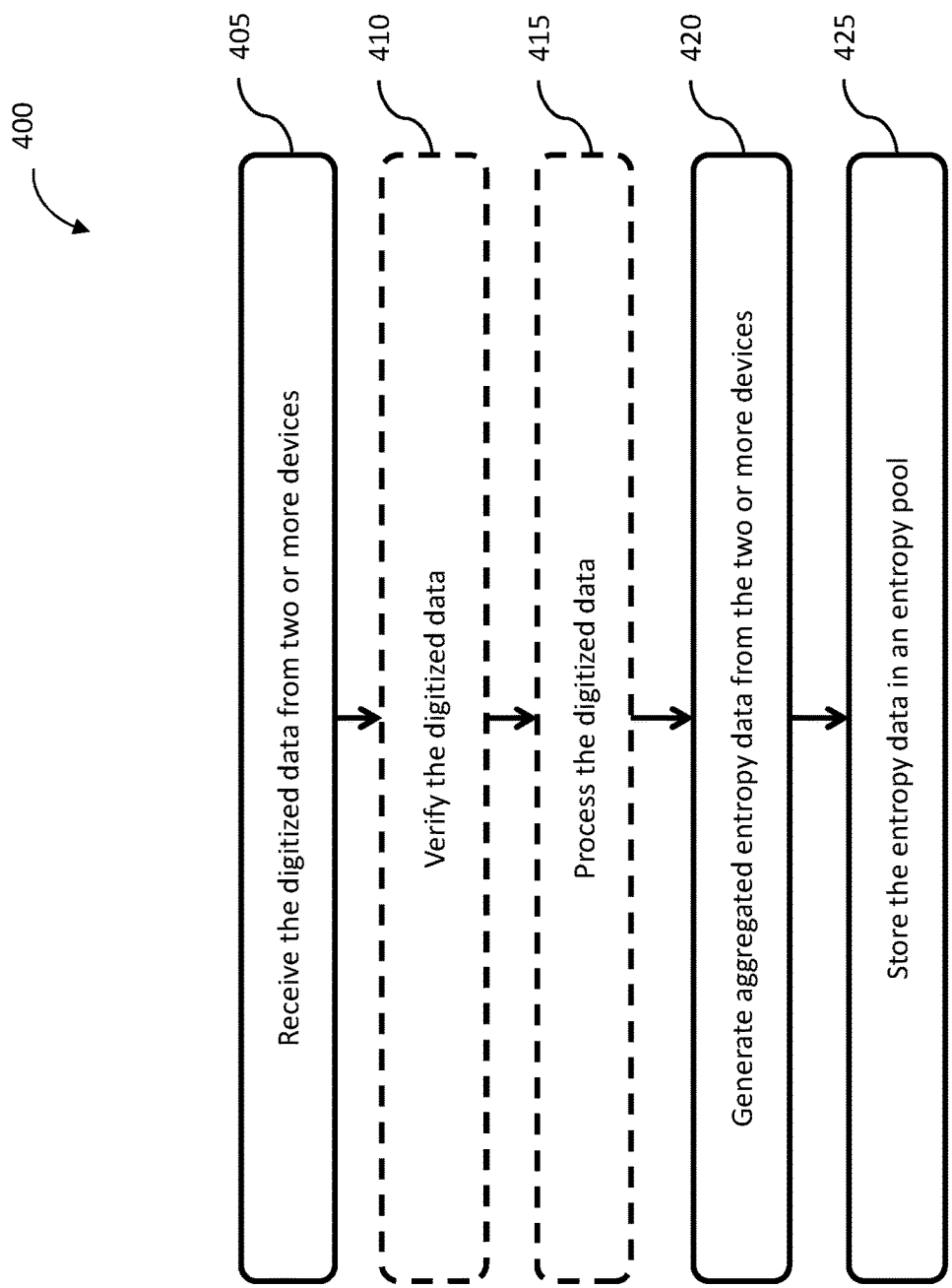
FIG. 4 is a flow diagram of a method for extracting entropy from data received from a mobile device to generate random numbers in accordance with an exemplary embodiment.

Now referring to FIG. 4, a flow diagram of a method 400 for extracting entropy from data received from a device to generate random numbers, in accordance with an exemplary embodiment, is depicted. At block 405, the data processing module 222 may receive digitized data from two or more devices 210. In some embodiments, the digitized data may be received over a secure connection. In some embodiments, the digitized data may be vibration data.

At optional block 410, the data processing module 222 may verify the digitized data. In some embodiments, the data processing module 222 may verify the digitized data using a public key corresponding to the private key used to generate a digital signature associated with the digitized data.

At optional block 415, the data processing module 222 may process the digitized data received from the one or more devices 210. If the digitized data was processed on the device 210, the data received from the device 210 may be entropy data. If the digitized data is entropy data, the method may proceed to block 420. If the digitized data is vibration data, then the data processing module 222 may normalize the data to generate a piece of entropy data. In some embodiments, normalizing the digitized data may include filtering and formatting the digitized data. For example, the data processing module 222 may remove any leading zeros from the digitized data. In some embodiments, the data processing module 222 may filter out or remove predictable portions of the number (e.g., only use the numbers that are not predictable). In some embodiments, the time domain data of the vibration data may not be able to be predicted. The values of the vibration data may depend on different factors, such as detecting vibration generated by fans running at different phase angles, detecting adjacent fans running at different frequencies, utilizing three axis data to add an unpredictable component of the vibration data, server component temperatures (e.g., radiator fans, I/O fans, etc.), and the like. In an alternative embodiment the normalization of the vibration data may be achieved by applying cryptographic hash functions to the vibration data to be normalized.

At block 420, the data aggregation module 224 may generate aggregated entropy data from the two or more devices 210. The data aggregation module 224 may obtain entropy data generated using data from at least two different devices 210. In some embodiments, aggregating the entropy data may include performing a bitwise exclusive OR (XOR) operation on the entropy data generated using the vibration data from the different devices 210 and a portion of the data in the entropy pool 228.

At block 425, the data aggregation module 224 may store the aggregated entropy data in an entropy pool 228 (also referred to as a random number pool). In some embodiments, the entropy pool 228 may be a non-volatile memory pool so that the data is immediately available when needed.

In some embodiments, a security breach may be detected. For example, a security breach associated with a network connection between the entropy server 220 and one or more devices 210 and/or one or more client devices 230 may be detected. Upon detection of a security breach, the random number pool (e.g., entropy pool 228) may be flushed to remove all entropy data stored in the entropy pool 228.

Now referring to FIG. 5, a flow diagram of a method 500 for requesting a random number from an entropy server, in accordance with an exemplary embodiment, is depicted. At block 505, an entropy server 220 may receive a request from a client device 230 for a random number. In some embodiments, the client device 230 may establish a secure network connection with the entropy server 220. In some embodiments, the client device 230 may provide one or more authentication credentials to the entropy server 220 to establish the secure network connection.

At block 510, the data extraction module 226 of the entropy server 510 may extract data from the entropy pool 228. In some embodiments, the data extraction module 226 may extract entropy data from the entropy pool 228 based on one or more rules. For example, the data extraction module 226 may extract the oldest entropy data from the entropy pool 228. In some embodiments, the data extraction module 226 may randomly select entropy data from the entropy pool 228.

At block 515, the data extraction module 226 of the entropy pool may format the entropy data into a random number. For example, the data extraction module 226 may format the entropy data into a random number in accordance with the request received from the client device 230. In some embodiments, the data extraction module 226 may apply one or more rules to the entropy data to format and/or generate the random number.

At block, 520, the data extraction module 226 of the entropy pool may transmit the random number to the client device 230. In some embodiments, the data extraction module 226 may transmit the random number to the client device 230 over a secure connection. In some embodiments, the random number may be encrypted (e.g., by the data extraction module 226) in a message received from the entropy server 220. In some embodiments, the client device 230 may decrypt the received message to obtain the random number received from the entropy server 220.

In some embodiments, the client device 230 may use the random number in a cryptographic mechanism. For instance, many aspect of cryptography may require random numbers. For examples, cryptographic mechanisms that may require a random number may include, but are not limited to, key generation, nonces, one-time pads, and salts (e.g., random data that is used as an additional input to a one-way function that hashes a password or passphrase) in certain signature schemes (e.g., elliptic curve digital signature algorithms).

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:
1. A computer-implemented method comprising:
receiving first vibration data from a first mobile device;
receiving second vibration data from a second mobile device;
generating a first piece of entropy data using the first vibration data and a second piece of entropy data using the second vibration data;
aggregating the first piece of entropy data and the second piece of entropy data to create an aggregated entropy data; and
storing the aggregated entropy data in an entropy pool, wherein the aggregating is perfumed prior to the storing.
2. The computer-implemented method of claim 1, further comprising:

receiving a request for a random number from a client device;
extracting entropy data from the entropy pool;
formatting the entropy data into the random number; and
transmitting the random number to the client device.

3. The computer-implemented method of claim 1, wherein the first vibration data is associated with a digital signature generated using the first vibration data and a private key, and the method further comprises:
verifying the digital signature using a public key corresponding to the private key.

4. The computer-implemented method of claim 1, wherein generating the first piece of entropy data using the first vibration data and the second piece of entropy data using the second vibration data further comprises:
normalizing the first vibration data to generate the first piece of entropy data, wherein normalizing comprises filtering and formatting the first vibration data; and
normalizing the second vibration data to generate the second piece of entropy data, wherein normalizing comprises filtering and formatting the second vibration data.

5. The computer-implemented method of claim 4, wherein formatting the first vibration data comprises applying a cryptographic hash function to the first vibration data and wherein formatting the second vibration data comprises applying the cryptographic hash function to the second vibration data.

6. The computer-implemented method of claim 1, wherein aggregating the first piece of entropy data and the second piece of entropy data further comprises:
performing a bitwise exclusive OR operation on the first piece of entropy data and the second piece of entropy data and a portion of the data in the entropy pool.

7. The computer-implemented method of claim 1, further comprising:
detecting a security breach; and
flushing the entropy pool.

8. A computer program product comprising a non-transitory storage medium readable by a processing circuit and storing instructions for execution by the processing circuit for performing a method comprising:
receiving first vibration data from a first mobile device;
receiving second vibration data from a second mobile device;
generating a first piece of entropy data using the first vibration data and a second piece of entropy data using the second vibration data;
aggregating the first piece of entropy data and the second piece of entropy data to create an aggregated entropy data; and
storing the aggregated entropy data in an entropy pool, wherein the aggregating is perfumed prior to the storing.

9. The computer program product of claim 8, the method further comprising:
receiving a request for a random number from a client device;
extracting entropy data from the entropy pool;
formatting the entropy data into the random number; and
transmitting the random number to the client device.

10. The computer program product of claim 8, wherein the first vibration data is associated with a digital signature generated using the first vibration data and a private key, and the method further comprises:
verifying the digital signature using a public key corresponding to the private key.

11. The computer program product of claim 8, wherein generating the first piece of entropy data using the first vibration data and the second piece of entropy data using the second vibration data further comprises:
normalizing the first vibration data to generate the first piece of entropy data, wherein normalizing comprises filtering and formatting the first vibration data; and
normalizing the second vibration data to generate the second piece of entropy data, wherein normalizing comprises filtering and formatting the second vibration data.

12. The computer program product of claim 11, wherein formatting the first vibration data comprises applying a cryptographic hash function to the first vibration data and wherein formatting the second vibration data comprises applying the cryptographic hash function to the second vibration data.

13. The computer program product of claim 8, wherein aggregating the first piece of entropy data and the second piece of entropy data further comprises:
performing a bitwise exclusive OR operation on the first piece of entropy data and the second piece of entropy data and a portion of the data in the entropy pool.

14. The computer program product of claim 8, the method further comprising:
detecting a security breach; and
flushing the entropy pool.

15. A system, comprising:
a processor in communication with one or more types of memory, the processor configured to:
receive first vibration data from a first mobile device;
receive second vibration data from a second mobile device;
generate a first piece of entropy data using the first vibration data and a second piece of entropy data using the second vibration data;
aggregate the first piece of entropy data and the second piece of entropy data to create an aggregated entropy data; and
store the aggregated entropy data in an entropy pool, wherein the aggregating is perfumed prior to the storing.

16. The system of claim 15, wherein the processor is configured to:
receive a request for a random number from a client device;
extract entropy data from the entropy pool;
format the entropy data into the random number; and
transmit the random number to the client device.

17. The system of claim 15, wherein the first vibration data is associated with a digital signature generated using the first vibration data and a private key, and the processor is further configured to:
verify the digital signature using a public key corresponding to the private key.

18. The system of claim 15, wherein, to generate the first piece of entropy data using the first vibration data and the second piece of entropy data using the second vibration data, the processor is further configured to:
normalize the first vibration data to generate the first piece of entropy data, wherein normalizing comprises filtering and formatting the first vibration data; and
normalize the second vibration data to generate the second piece of entropy data, wherein normalizing comprises filtering and formatting the second vibration data.

19. The system of claim 15, wherein, to aggregate the first piece of entropy data and the second piece of entropy data, the processor is further configured to:
    perform a bitwise exclusive OR operation on the first piece of entropy data and the second piece of entropy data and a portion of the data in the entropy pool.

20. The system of claim 15, wherein the processor is configured to:
    detect a security breach; and
    flush the entropy pool.

\* \* \* \* \*